United States Patent
Garofalo et al.

(10) Patent No.: US 10,516,545 B2
(45) Date of Patent: Dec. 24, 2019

(54) CONGESTION MANAGEMENT IN A MULTICAST COMMUNICATION NETWORK

(71) Applicant: TELECOM ITALIA S.p.A., Milan (IT)

(72) Inventors: Angelo Garofalo, Turin (IT); Eugenio Maria Maffione, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/108,494

(22) PCT Filed: Dec. 31, 2013

(86) PCT No.: PCT/EP2013/078160
§ 371 (c)(1),
(2) Date: Jun. 27, 2016

(87) PCT Pub. No.: WO2015/101402
PCT Pub. Date: Jul. 9, 2015

(65) Prior Publication Data
US 2016/0323116 A1 Nov. 3, 2016

(51) Int. Cl.
*H04L 12/18* (2006.01)
*H04L 12/26* (2006.01)
(Continued)

(52) U.S. Cl.
CPC ........ *H04L 12/185* (2013.01); *H04L 43/0829* (2013.01); *H04L 47/11* (2013.01); *H04L 47/806* (2013.01); *H04L 65/4076* (2013.01)

(58) Field of Classification Search
CPC ... H04L 12/185; H04L 47/11; H04L 43/0829; H04L 47/806; H04L 65/4076; H04L 12/1868; H04L 49/20
See application file for complete search history.

(56) References Cited

U.S. PATENT DOCUMENTS

| 6,188,674 B1 * | 2/2001 | Chen ................... H04L 43/0835 370/252 |
| 6,732,182 B1 * | 5/2004 | Beverly, IV ............ H04L 12/18 370/244 |

(Continued)

FOREIGN PATENT DOCUMENTS

| CN | 1555155 A | 12/2004 |
| CN | 101582852 A | 11/2009 |

(Continued)

OTHER PUBLICATIONS

Benoit Hilt, et al., "Managing multicast tree reachability with PIM", IEEE Globecom Workshop, Dec. 6, 2010, XP031859083, (6 pages).

(Continued)

*Primary Examiner* — Ivan O Latorre
(74) *Attorney, Agent, or Firm* — Oblon, McClelland, Maier & Neustadt, L.L.P.

(57) ABSTRACT

It is disclosed a method for managing a congestion in a communication network supporting the transmission of multicast data flows. The method comprises, upon detection of a congestion at a transmission interface of a router: identifying a multicast data flow being forwarded through the transmission interface and suffering a packet loss; interrupting the transmission of the data flow through the transmission interface downstream the router and, in case the data flow would be transmitted downstream the router trough the transmission interface only, sending a request to an upstream router for interrupting the transmission of the data flow from the upstream router to the router; and inhibiting, for a given period of time, any request to forward the data flow via the transmission interface.

13 Claims, 5 Drawing Sheets

(51) Int. Cl.
  *H04L 12/801* (2013.01)
  *H04L 12/927* (2013.01)
  *H04L 29/06* (2006.01)

(56) References Cited

U.S. PATENT DOCUMENTS

| | | | | |
|---|---|---|---|---|
| 6,771,594 | B1* | 8/2004 | Upadrasta | H04L 29/06027 370/228 |
| 7,035,217 | B1* | 4/2006 | Vicisano | H04L 1/1671 370/236 |
| 7,940,685 | B1* | 5/2011 | Breslau | H04L 43/0835 370/251 |
| 8,131,867 | B1* | 3/2012 | Luby | H04L 12/1886 370/229 |
| 8,300,525 | B1* | 10/2012 | Kohn | H04L 43/022 370/230 |
| 8,320,239 | B1 | 11/2012 | Trossen | |
| 9,036,468 | B1* | 5/2015 | Agarwal | H04L 47/32 370/230 |
| 9,813,319 | B1* | 11/2017 | Gan | H04L 43/0829 |
| 2005/0282571 | A1* | 12/2005 | Oprescu-Surcobe | H04W 28/10 455/503 |
| 2008/0144519 | A1* | 6/2008 | Cooppan | H04L 41/142 370/252 |
| 2009/0323526 | A1 | 12/2009 | Pike et al. | |
| 2010/0142524 | A1 | 6/2010 | Garofalo et al. | |
| 2011/0044171 | A1* | 2/2011 | Csaszar | H04L 12/18 370/235 |
| 2011/0249551 | A1* | 10/2011 | Rollins | H04L 12/437 370/222 |
| 2014/0376366 | A1* | 12/2014 | Li | H04L 45/16 370/230 |
| 2016/0080446 | A1* | 3/2016 | Karthikeyan | H04L 65/4076 709/219 |

FOREIGN PATENT DOCUMENTS

| | | |
|---|---|---|
| CN | 102075417 A | 5/2011 |
| JP | 2006-287818 | 10/2006 |
| JP | 2007-174489 | 7/2007 |
| WO | 2009/129828 A1 | 10/2009 |

OTHER PUBLICATIONS

International Search Report dated Sep. 10, 2014 for PCT/EP2013/078160 filed on Dec. 31, 2013.

* cited by examiner

CONGESTION MANAGEMENT IN A MULTICAST COMMUNICATION NETWORK

TECHNICAL FIELD

The present invention relates to the field of communication networks. In particular the present invention relates to a method for managing a congestion in a multicast communication network.

BACKGROUND ART

As known, in a packet-switched communication network, in particular an IP (Internet Protocol) communication network, the transmission of data flows between a source and one or more end users (also referred to clients or hosts) may be unicast (point to point) or multicast (point to multipoint). The multicast transmission technique is used for distributing the same data flow from the source to a group of clients simultaneously and synchronously. This group of clients is typically referred to as multicast distribution group and, within an IP communication network, is identified by an IP multicast address. Typical services using multicast transmission techniques are streaming video and gaming. The data flow distribution is generally performed along a so called "multicast distribution tree" whose root is the data source device (e.g. the server of an information provider) and whose leaves are the end users' devices. Typically, the multicast distribution tree comprises a number of multicast routers, which are configured to route the data flow from the source to the clients. Each client wishing to receive a particular data flow from a given source typically sends a membership request on the network segment to which the client is attached in order to join the multicast distribution group related to that particular data flow.

As known, the IGMP (Internet Group Management Protocol) protocol is a communication protocol used by clients and by their adjacent multicast routers of the multicast distribution tree for establishing multicast group memberships. In particular, a membership report message is sent by a host on the network segment to which the host is attached and it is received by its adjacent multicast router. This report message indicates that the host is interested in joining a multicast distribution group for receiving a given data flow. A leave group message is sent by a host when it decides to leave the multicast distribution group.

The PIM (Protocol Independent Multicast) protocol is a routing protocol used between the multicast routers of the multicast distribution tree to direct the data flow from the source to the clients of a multicast distribution group. In particular, a multicast router that received a IGMP membership report from a host requiring to join a given multicast distribution group, typically sends a PIM join message towards the source of the data flow possibly through intermediate multicast routers, for connecting the intervening multicast routers to the multicast distribution tree. In this way, as known, these multicast routers are able to receive the data flow from the source and forward it towards the joined host. On the contrary, a PIM prune message is typically sent by a multicast router when it leaves a multicast distribution tree.

The quality of the services typically distributed using a multicast transmission technique (e.g. streaming video) is critically dependent of the percentage of packets that are lost or damaged during the multicast transmission from the source to the clients. Moreover, typically, multicast transmissions do not implement any mechanism for retransmission of lost or damaged packets. In view of the above, any congestion event occurring at a multicast router may cause a packet loss which may heavily and irreversibly degrade the quality of the service delivered to the clients of a multicast distribution group. Moreover, other data flows routed by the same multicast router may be affected by losses, so that other multicast distribution groups may experience a service quality degradation. A congestion event occurs when the bandwidth available at a transmission interface of the multicast router is exceeded. In the following, a "congestion event" or simply "congestion" will indicate that at least one transmission interface of a multicast router has not sufficient bandwidth to handle the data flows routed through that interface. A multicast router experiencing a congestion event will be indicated also as "congested router" and the related interface as "congested transmission interface".

US 2010/0142524, in the name of the Applicant, discloses a method for serving an aggregate flow in a communication network node including a plurality of individual flows. The method includes identifying in the aggregate flow, based on serving resources allocated to the network node, individual flows that may be served without substantial detriment to perceived performance, and serving the identified individual flows with priority with respect to the remaining individual flows in the aggregate flow.

The method disclosed in US 2010/0142524 is even a congestion control method that may limit the effects of a congestion event at a multicast router by defining a set of pre-defined logics on the congested multicast router for preserving the quality of service of given data flows. This method provides for knowing, at the congested multicast router, which data flows are experiencing a quality of service degradation due to heavy packet losses. According to the method of US 2010/0142524, if a transmission interface of a multicast router become congested because of the establishment of a new data flow, the quality of service of pre-existing data flows is preserved to the detriment of the quality of service of the new data flow, which will experience a higher packet loss.

The method of US 2010/0142524 however does not allow to remove the congestion event at the multicast router and does not allow avoiding the waste of transmission resources both downstream (i.e. from the congested multicast router to the hosts) and upstream (i.e. from the source to the congested multicast router) the congested multicast router. In particular, downstream the congested multicast router, the waste of transmission resources is caused by the fact that the packets of a data flow routed through the congested transmission interface are either lost or, if not lost, they are anyway delivered to the hosts. These packets, however, are not sufficient to provide a service with an acceptable quality. Upstream the congested router, the transmission resources used to route this same data flow up to the congested router are actually wasted and they could be more conveniently used to deliver other data flows that are not affected by the congestion event.

WO 2009/129828 discloses a technique for traffic handling in congestion situations in a point-to-multipoint (PTM) enabled network. The disclosed technique is performed in an egress node of the network and comprises the steps of detecting marked packets, the marking being indicative of a congestion situation in a core node of the PTM enabled network; selecting, based on the detected markings, a particular PTM flow from one or more PTM flows passing the egress node for termination; and indicating the selected PTM flow in an upstream direction of the selected flow. Upon detection of a marked packet, each egress node decides that the flow is to be terminated and sends a PIM prune message upstream in the direction of the congested node.

SUMMARY OF THE INVENTION

The inventors noticed that, according to the method of WO 2009/129828, the congestion management is client-driven. In particular, according to the method of WO 2009/129828 the decision to initiate pruning of the multicast distribution tree affected by a congestion event, i.e. to terminate a data flow which is routed via the congested multicast router, is taken by the hosts of the multicast distribution group. Therefore, in order to implement the method of WO 2009/129828, the hosts of a multicast distribution group require enhanced traffic handling functionalities as they should implement a dedicated logic for detecting marked packets and for deciding which data flow to terminate, such logic being not standard in commercially available host devices. In other words, commercially available host devices may not be able to implement the required functionalities and may require ad hoc modifications. If at least one host device is not able to implement the required functionalities, the mechanism disclosed in WO 2009/129828 may be not effective.

Moreover, implementation of the method of WO 2009/129828 requires a tight coordination among the hosts of a multicast distribution group. When a congestion event occurs, each host must leave the multicast distribution tree affected by the congestion. If at least one host does not leave the multicast distribution tree, the packets continue to be forwarded to that host and the mechanism is ineffective. This coordinated pruning operation required by the method of WO 2009/129828 is effective only if each host of a group arrives to the same decision regarding which data flow is to be terminated. This is critically dependent on the implementation of the rules used to take the decision at each host.

Moreover, different multicast distribution trees may share a congested interface of a multicast router. In this case, according to the method of WO 2009/129828, hosts belonging to the different trees may decide to terminate their respective data flows because they all traverse the congested interface. However, this may lead to an unnecessary loss of data flows if, for instance, the congestion could be recovered by terminating a single data flow.

Finally, the inventors noticed that since the method of WO 2009/129828 is client-driven and relies on the decision of the hosts about the termination of the data flows, a decision is taken only when a marked packet reaches the host. Hence, this method may require inefficiently long times for managing the congestion.

In view of the above, the inventors have addressed the problem of providing a method for managing a congestion in a multicast communication network, which allows avoiding the drawbacks outlined above. In particular, the inventors have addressed the problem of providing a method for managing a congestion in a multicast communication network which is not client-driven and hence which can be implemented in a multicast communication network without requiring any customization of the host devices.

In the following description and in the claims the terms "data message", "data packet", "packet", "data unit", "datagram" and the like may be indifferently used to indicate the elementary block of a data flow exchanged between the nodes of the multicast communication network, in particular a packet-switched multicast communication network, more in particular an IP multicast communication network. The expression "signaling message" will however indicate a message issued according to a protocol or standard used for operating the multicast communication network, such as a communication protocol and a routing protocol (for instance, respectively, the IGMP protocol and the PIM protocol described above). According to the present description, a signaling message is a stand-alone message. Examples of signaling messages, are the membership report message and the leave group message provided by the IGMP protocol, and the join message and the prune message provided by the PIM protocol.

According to the present invention, the problem above is solved by providing a method for managing a congestion in a multicast communication network which is implemented at a multicast router of the network experiencing a congestion event. In particular, the method is implemented in a flow-based manner as it provides for:

applying a congestion control method, such as the method of WO 2010/0142524, to any data flow at the congested router, the method being able to provide evidence of the data flows that suffer packet losses (referred to in the following as "bad served data flows") and provide related notifications (referred to in the following as "bad served flow notifications")

at the congested router, interrupting the downstream transmission of any data flow that is passing through the congested transmission interface and is experiencing a not negligible packet loss (and notified through a related bad served flow notification" message);

at the congested router, sending upstream a request not to receive the bad served data flow (i.e. a request to leave the corresponding multicast distribution tree), if the data flow identified as "bad served" is distributed downstream the congested router only trough the congested transmission interface and is not replicated towards other transmission interfaces of the same router. In other words, in this case, the congested router sends to the upstream router a request for interrupting the transmission of a bad served data flow from the upstream router to the congested router. In such manner, the upstream router will interrupt forwarding the bad served data flow to the congested router. Advantageously, when the routing of the bad served data flow to the congested router is interrupted, the transmission resources are released and they may be more efficiently used for other data flows not affected by the congestion event; and at the congested router, inhibiting, for a given period of time, any request to forward those bad served data flows. This advantageously allows avoiding instabilities within the multicast communication network which may arise in case a host or a multicast router repeatedly tries to ask for a given data flow whose distribution has been interrupted according to the above.

According to a first aspect, the present invention provides a method for managing a congestion in a communication network, the network supporting the transmission of a number of multicast data flows, the method comprising, upon detection of a congestion at a transmission interface of a router of the network:

a) identifying a multicast data flow being forwarded through the transmission interface and suffering a packet loss;

b) interrupting the transmission of the data flow through the transmission interface downstream the router and, in case the data flow would be transmitted downstream the router trough the transmission interface only, sending a request to an upstream router for interrupting the transmission of the data flow from the upstream router to the router; and c) inhibiting, for a given period of time, any request to forward the data flow via the transmission interface.

Preferably, identifying comprises measuring a packet loss of the data flow.

Preferably, identifying comprises issuing a bad served flow notification comprising information associated to the data flow, the information being indicative of:

a source node of the data flow;

a multicast distribution group associated to the data flow; and the transmission interface.

Preferably, the method further comprises processing the bad served flow notification and using the information contained therein to write/update an entry in a membership inhibition table, the entry being associated to the data flow and containing the information indicative of a source node of the data flow, a multicast distribution group associated to the data flow and the transmission interface.

Profitably, the entry further comprises an expiration time indicative of a time at which the entry will be removed from the membership inhibition table, the expiration time starting upon writing/updating of the information of the bad served flow notification into the membership inhibition table.

Preferably, step b) comprises issuing a forged signaling message simulating a signaling message that the router would receive via the transmission interface from a node of the network downstream the router, for requesting the interruption of the transmission of the data flow from the router to the downstream node.

Preferably, the downstream node is a destination node of the multicast distribution group and the forged signaling message is a IGMP leave group message.

Preferably, the downstream node is a further router of the network belonging to a multicast distribution tree associated with the data flow and the forged signaling message is a PIM prune message.

Preferably, step c) comprises, upon reception of a membership message from a destination node of the network indicative of the fact that the destination node wants to receive the data flow, checking whether the membership inhibition table comprises one or more entries related to the multicast distribution group and the transmission interface, and, in the affirmative, dropping the membership message.

Preferably, the membership message is a IGMP membership report message.

Preferably, step c) comprises, upon reception of a join message from a further router of the network belonging to a multicast distribution tree associated with the data flow, the join message being indicative of the fact that the further router wants to receive the data flow, checking whether the membership inhibition table comprises one or more entries related to the multicast distribution group and the transmission interface, and, in the affirmative, on the basis of the one or more entries, modifying the join message so as to remove a portion of the join message related to the source node and any other source node transmitting the data flow to the multicast distribution group through the transmission interface.

Preferably, the join message is a PIM join message.

According to a second aspect, the present invention provides a computer program product comprising computer-executable instructions for performing, when the program is run on a computer, the steps of the method as set forth above.

According to a third aspect, the present invention provides a router for a communication network supporting the transmission of a number of multicast data flows, the router comprising:

a congestion control unit configured to, upon detection of a congestion at a transmission interface of the router, identify a multicast data flow being forwarded through the transmission interface and suffering a packet loss; and a multicast congestion manager configured to:

interrupt the transmission of the data flow through the transmission interface downstream the router and, in case the data flow would be transmitted downstream the router, trough the transmission interface only, send a request to an upstream router for interrupting the transmission of the data flow from the upstream router to the router; and inhibit, for a given period of time, any request to forward the data flow via the transmission interface.

According to a fourth aspect, the present invention provides a communication network comprising a router as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
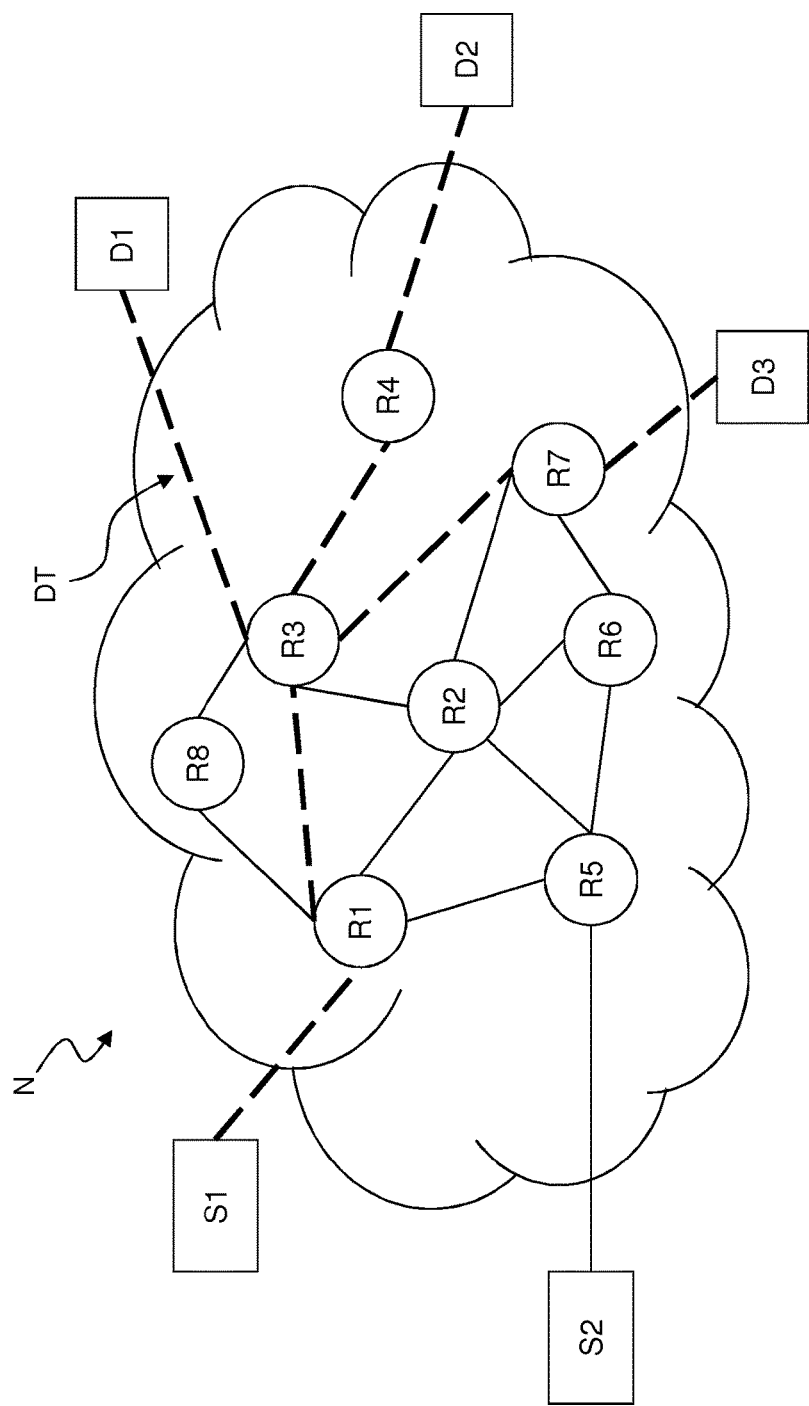
FIG. 1 schematically shows a multicast communication network.

FIG. 1 schematically shows a communication network N.

Preferably, the communication network N is a packet-switched communication network, more preferably an IP communication network. Preferably, the communication network N implements a multicast transmission technique.

The communication network N comprises a number of nodes. In particular, the communication network N comprises two source nodes S1, S2, three destination nodes D1, D2, D3 and eight intermediate nodes R1-R8 between the source nodes S1, S2 and the destination nodes D1, D2, D3. The nodes of the communication network N are preferably connected according to a mesh topology.

A source node S1, S2 may comprise a server of a service provider such as, e.g., the server of a video streaming provider. A destination node D1, D2, D3 is a client or host device. A client or host device may be located at an end user premises and it may be a computer, a TV apparatus, a tablet, a smartphone or the like. An intermediate node R1-R8 is preferably a router, more preferably a multicast router. In the following, the intermediate nodes R1-R8 will be referred to as routers without limiting the invention. Preferably, each destination node D1, D2, D3 is connected to a respective router R3, R4, R7. The routers R3, R4, R7 adjacent to the destination nodes D1, D2, D3 will be referred to as "local routers". The other routers R1, R2, R5, R6, and R8 will be referred to as "remote routers". Moreover, the connection between a local router R3, R4, R7 and a destination node D1, D2, D3 will be referred to in the following as "last hop".

Preferably, each source node S1, S2 is configured to generate data flows to be routed towards the destination nodes D1, D2, D3. Preferably, the data flows generated by each source node S1, S2 are multicast data flows directed towards a number of destination nodes D1, D2, D3 via the routers R1-R8.

A multicast distribution group comprises the destination nodes D1, D2, D3 configured to receive a same data flow from a source node S1, S2. A multicast distribution tree comprises a path within the communication network N along which a data flow is distributed from a source node S1, S2 to a number of destination nodes D1, D2, D3. A multicast distribution tree comprises the source node S1, S2 generating the data flow, the number of destination nodes D1, D2, D3 receiving the data flow and one or more routers R1-R8, through which the data flow is forwarded from the source node S1, S2 to the destination nodes D1, D2, D3.

As an example, FIG. 1 shows, in dotted line, a multicast distribution tree DT for the distribution of a data flow DF from the source node S1 to all the destination nodes D1, D2, D3. The exemplary multicast distribution tree DT shown in FIG. 1 comprises four routers R1, R3, R4 and R7.

Preferably, the nodes of the communication network N are configured to operate according to one or more communication protocols and one or more routing protocols. In particular, preferably, communication between the destination nodes D1, D2, D3 and their local routers R3, R4, R7 is operated according to the IGMP communication protocol. Moreover, preferably, routing between the routers R1-R8 is operated according to the PIM routing protocol.

Figure 2:
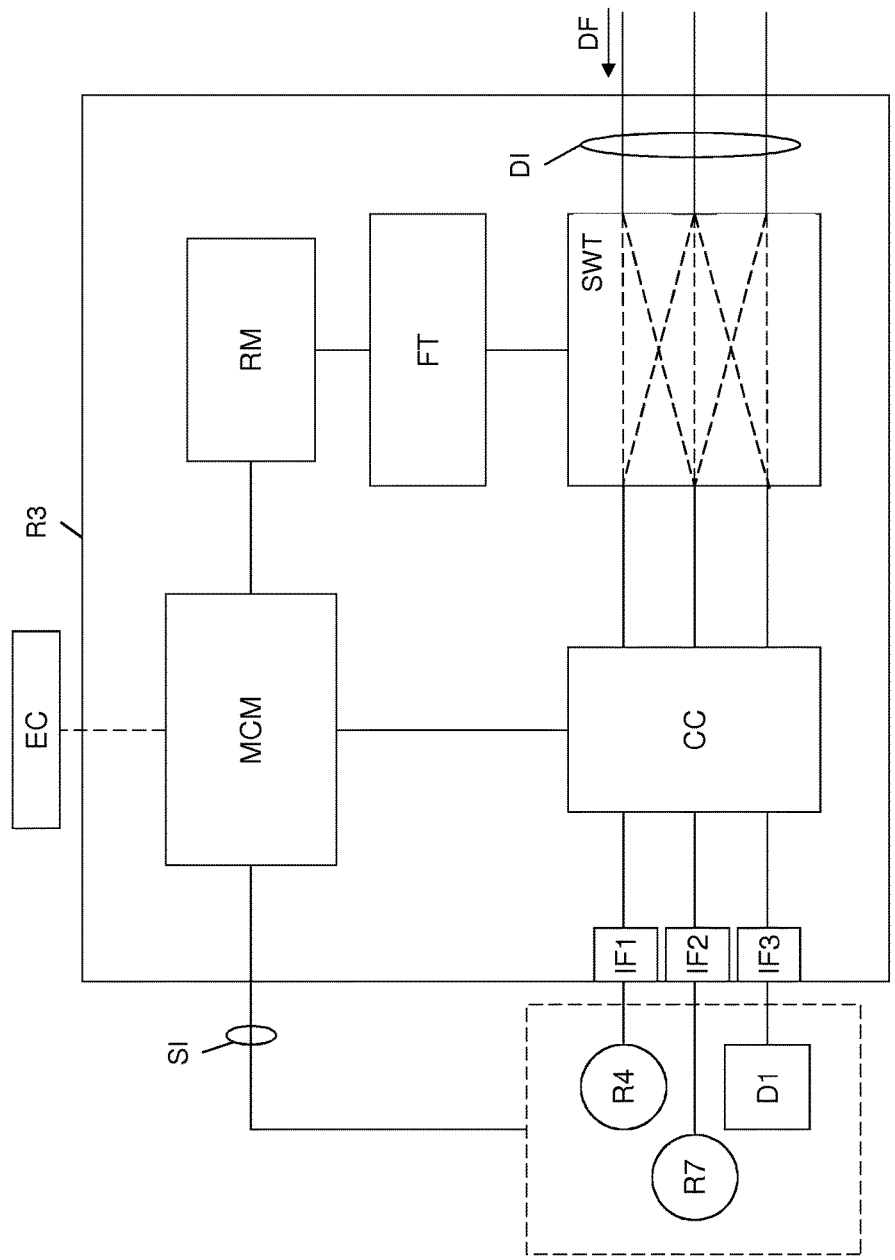
FIG. 2 schematically shows a block diagram of a multicast router according to a preferred embodiment of the present invention.

FIG. 2 shows a router R3 according to a preferred embodiment of the present invention. The other routers R1, R2, R4-R8 of the communication network N have a similar structure. The router R3 belongs to the multicast distribution tree DT shown in FIG. 1.

The router R3 preferably comprises a switching fabric SWT, a forwarding table FT, a replication manager RM, a multicast congestion manager MCM, a congestion control unit CC and a number of transmission interfaces. The router R3 of FIG. 2 comprises, for example, a first transmission interface IF1, a second transmission interface IF2 and a third transmission interface IF3. The router R3 may comprise other components not shown in FIG. 2 as they are not relevant to the present description.

It is to be noticed that the interfaces of a router within the network N, are preferably bidirectional (input/output) interfaces. In a multicast communication network, for a given data flow, one interface acts as input interface for that given data flow and one or more other interfaces act as output interfaces. In the following description, for sake of simplicity, the inputs of the router are schematically separated from the outputs and the transmission interfaces mentioned above will be referred to as the output interfaces of the router.

According to the scheme shown in FIG. 2, the router R3 has preferably data inputs DI and signaling inputs SI. The data inputs DI are the inputs through which data flows enter the router R3. FIG. 2 shows, exemplarily, three data inputs DI. In particular, in FIG. 2, one of the data inputs DI of the router R3 is associated with the data flow DF distributed along the multicast distribution tree DT from the source node S1 to the destination nodes D1, D2, D3. Signaling inputs SI are inputs through which signaling messages Sm enter the router R3 from the other nodes of the network N. In FIG. 2, signaling inputs SI are represented, for sake of simplicity, by a single line connecting the router R3 and the network nodes downstream the router R3 within the multicast distribution tree DT, namely the routers R4 and R7 and the destination node D1.

The switching fabric SWT has preferably a number of inputs (e.g. three in FIG. 2) corresponding to the data inputs DI of the router R3 and a further input from the forwarding table FT. The switching fabric SWT has preferably a number of outputs (e.g. three in FIG. 2) connected to the congestion control unit CC. Each output of the switching fabric SWT is connected to a respective input of the congestion control unit CC. The congestion control unit CC has a number of outputs (e.g. three in FIG. 2), each one connected to a respective transmission interface IF1, IF2, IF3. The congestion control unit CC preferably has a further output connected to an input of the multicast congestion manager MCM. The multicast congestion manager MCM has an output connected to the replication manager RM which is in turn connected to the forwarding table FT. The forwarding table FT has an output connected to the switching fabric SWT, as already described above.

The multicast congestion manager MCM has further inputs corresponding to the signaling inputs SI of the router R3 and a further optional output connected to an optional external control system EC.

The external control system EC may be integrated in one of the nodes of the communication network N or it may be a stand-alone device. In both cases, it is preferably configured to cooperate with the routers R1-R8 of the communication network N for receiving notification messages from the routers R1-R8 relating to their operation. The external control system EC is further configured to be accessed by a network operator for monitoring the congestion events occurring at one of the routers R1-R8, collecting information about the data flows being routed therein and tracking the operations performed by the router to face congestion events.

Within the exemplary router R3 of FIG. 2, the switching fabric SWT is configured to receive data flows from other nodes of the network N via the data inputs DI and to redirect each data flow to a respective output port, connected to a respective transmission interface IF1, IF2, IF3. Each transmission interface IF1, IF2, IF3 is then connected to a respective router or destination node towards which the respective data flow is to be delivered. In the exemplary situation illustrated in FIGS. 1 and 2, where the data flow DF is distributed from the source node S1 to the destination nodes D1, D2 and D3, the first transmission interface IF1 is connected to the router R4, the second transmission interface IF2 is connected to the router R7 and the third transmission interface IF3 is connected to the destination node D1.

The forwarding table FT is preferably configured to comprise a routing table. In particular, for each data flow handled by the router R3, the forwarding table FT is preferably configured to store a forwarding rule indicative of the transmission interface(s) through which the data flow is to be routed by the router R3. The forwarding table FT is preferably configured to cooperate with the switching fabric SWT so that, on the basis of the forwarding rules contained therein, the switching fabric SWT may operate the switching of each received data flows towards one or more transmission interfaces IF1, IF2, IF3.

The congestion control unit CC is preferably configured to implement a congestion control mechanism on a per data flow basis, such as the mechanism described in US 2010/0142524 cited above. Moreover, preferably, the congestion control unit CC is configured to provide, for each transmission interface IF1, IF2, IF3, information indicative of the data flows routed through that interface and which are experiencing critical (i.e. not negligible) percentages of packet losses (as mentioned above, these data flows will be indicated as "bad served data flows"). In order to do this, the congestion control unit CC is preferably configured to measure, for each transmission interface IF1, IF2, IF3, the packet loss of each data flow passing through that interface, and to compare the packet loss of each data flow to a threshold. If the packet loss exceeds the threshold, the data flow is identified as a bad served data flow. The threshold is preferably set on the router R3 by a network provider. The threshold is preferably chosen on the basis of, for example, the type of the service carried by the data flows (e.g. voice, video, data) and, for each type of service, on the basis of the data coding (for instance, for a video service, high definition coding, standard coding, etc.). Moreover, a data flow is preferably identified as a bad served data flow if its packet loss remains above the threshold for a given period of time, which may be, for instance, few seconds.

The congestion control unit CC is then preferably configured to issue bad served flow notifications BSFn comprising the information indicative of the bad served flows and to send them to the multicast congestion manager MCM, as it will be described in greater detail herein after.

Each bad served flows notification BSFn issued by the congestion control unit CC preferably comprises:
  information indicative of the source of a bad served data flow (e.g.
IP address of the source node S1 within the multicast distribution tree DT);
  information indicative of the associated multicast distribution group (e.g. the IP multicast address of the multicast distribution group); and
  information indicative of the transmission interface IF1, IF2, IF3 experiencing a congestion event though which the bad served data flow is to be routed.

Other information may be included within a bad served flow notification BSFn, such as a class of service associated to the data flow and/or a timestamp indicating the time at which the congestion event occurred.

The replication manager RM is preferably configured to determine, update or modify the forwarding rules comprised within the forwarding table FT, on the basis of signaling messages Sm received from the other nodes of the network N via the signaling inputs SI and processed by the multicast congestion manager MCM. The multicast congestion manager MCM is preferably configured to receive and process these signaling messages, and to forward them, or a modified version thereof, to the replication manager RM, as it will be explained hereinafter. The multicast congestion manager MCM is moreover preferably configured also to generate forged signaling messages FSm and send them to the replication manager RM, as it will be explained hereinafter.

The components of the router R3 shown in FIG. 2 may be implemented as hardware components, software programs or hardware components running a dedicated software program.

Figure 3:
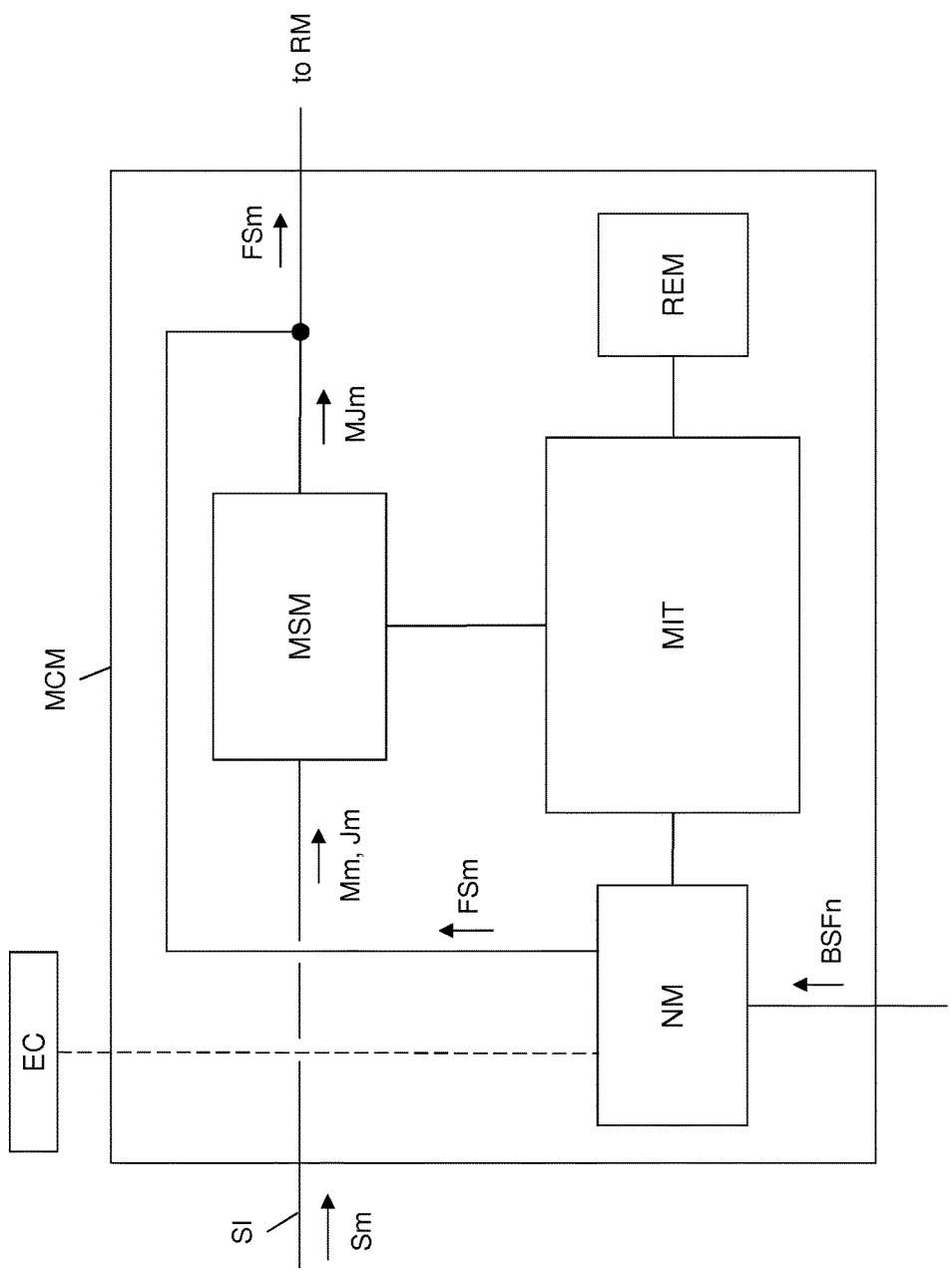
FIG. 3 schematically shows a block diagram of a multicast congestion manager according to a preferred embodiment of the present invention.

FIG. 3 schematically shows a multicast congestion manager MCM according to the preferred embodiment of the present invention. The multicast congestion manager MCM preferably comprises a notification manager NM, a multicast signaling manager MSM, a membership inhibition table MIT and a rule expiration manager REM. The multicast congestion manager MCM may comprise other components that are not shown in FIG. 3 as they are not relevant to the present invention. The multicast congestion manager MCM has preferably two inputs (one is the signaling input SI and the other is connected to the congestion control unit CC) and two outputs (a first output is connected to the RM, a second one is connected to the external control system EC). The notification manager NM has an input that corresponds to the input of the multicast congestion manager MCM connected to the congestion control unit CC, and two outputs corresponding to the two outputs of the multicast congestion manager MCM. The signaling input SI of the multicast congestion manager MCM is connected to the input of the multicast signaling manager MSM, whose output is connected to the first output of the multicast congestion manager MCM. Both the notification manager NM and the multicast signaling manager MSM are further connected to the membership inhibition table MIT, which is in turn connected to the rule expiration manager REM. The notification manager NM, the multicast signaling manager MSM and the rule expiration manager REM are preferably configured to read and/or write information from/to the membership inhibition table MIT, as it will be described in greater detail herein after.

The notification manager NM is preferably configured to receive from the congestion control unit CC the bad served flows notifications BSFn comprising information indicative of the bad served data flows. On the basis of the received bad served flows notifications BSFn, the notification manager NM is preferably configured to write/update the information contained into the membership inhibition table MIT on a per data flow basis. In particular, for each bad served data flow notification BSFn, the notification manager NM preferably writes/updates a respective entry of the membership inhibition table MIT comprising the information included in the bad served flow notification BSFn, namely:
  information indicative of the source of the bad served data flow (e.g. IP address of the source node S1 within the multicast distribution tree DT);
  information indicative of the associated multicast distribution group (e.g. the IP multicast address of the multicast distribution group); and
  information indicative of the transmission interface IF1, IF2, IF3 experiencing a congestion event though which the bad served data flow is to be routed.

In the present description and in the Figures, an entry associated to a given data flow experiencing a congestion event will be indicated also with the tuple <S, G, IF>, wherein S will indicate generically the source node, G the multicast distribution group and IF the transmission interface. In particular, the notation <*, G, IF> will indicate all the entries related to the multicast distribution group G and the transmission interfaces IF, i.e. all the entries related to data flows generated by any source node and distributed to the destination nodes belonging to the group G via the transmission interface IF.

Therefore, each entry of the membership inhibition table MIT is associated to a data flow experiencing a congestion event. As it will be explained herein after, according to the present invention, the membership inhibition table MIT is checked each time a destination device of the network N requests to join or rejoin a given multicast distribution group so as to inhibit any request to forward a bad served data flow.

Moreover, each entry of the membership inhibition table MIT preferably comprises also an expiration time. The expiration time associated to each entry of the membership inhibition table MIT preferably indicates a time at which the entry from the membership inhibition table MIT is removed by the rule expiration manager REM. It is preferably computed as the time at which the entry is written or updated into the membership inhibition table MIT incremented by a fixed time-to-live TTL that determines the lifetime of the entry into the membership inhibition table MIT. The time-to-live may be, for example, 180 seconds and is preferably predetermined by the network operator. The expiration time associated to each entry is preferably refreshed each time the notification manager NM receives a bad served flow notification related to the data flow associated to the entry. Therefore, an entry is preferably removed if, for a period of time substantially equal to the time-to-live TTL, this entry has not been refreshed, i.e. the notification manager NM has not received any bad served flow notification related to this entry.

The rule expiration manager REM is preferably configured to periodically check the entries of the membership inhibition table MIT and delete the entries whose expiration time expired, as it will be described in greater detail herein after.

The multicast signaling manager MSM is preferably configured to process the signaling messages Sm received by the router R3 via the signaling inputs SI and/or to generate forged signaling messages FSm, as it will be described herein after.

The operation of the multicast configuration manager MCM, and in particular of the multicast signaling manager MSM, will be described in the following with reference to the flow charts of FIGS. 4 and 5.

Figure 4:
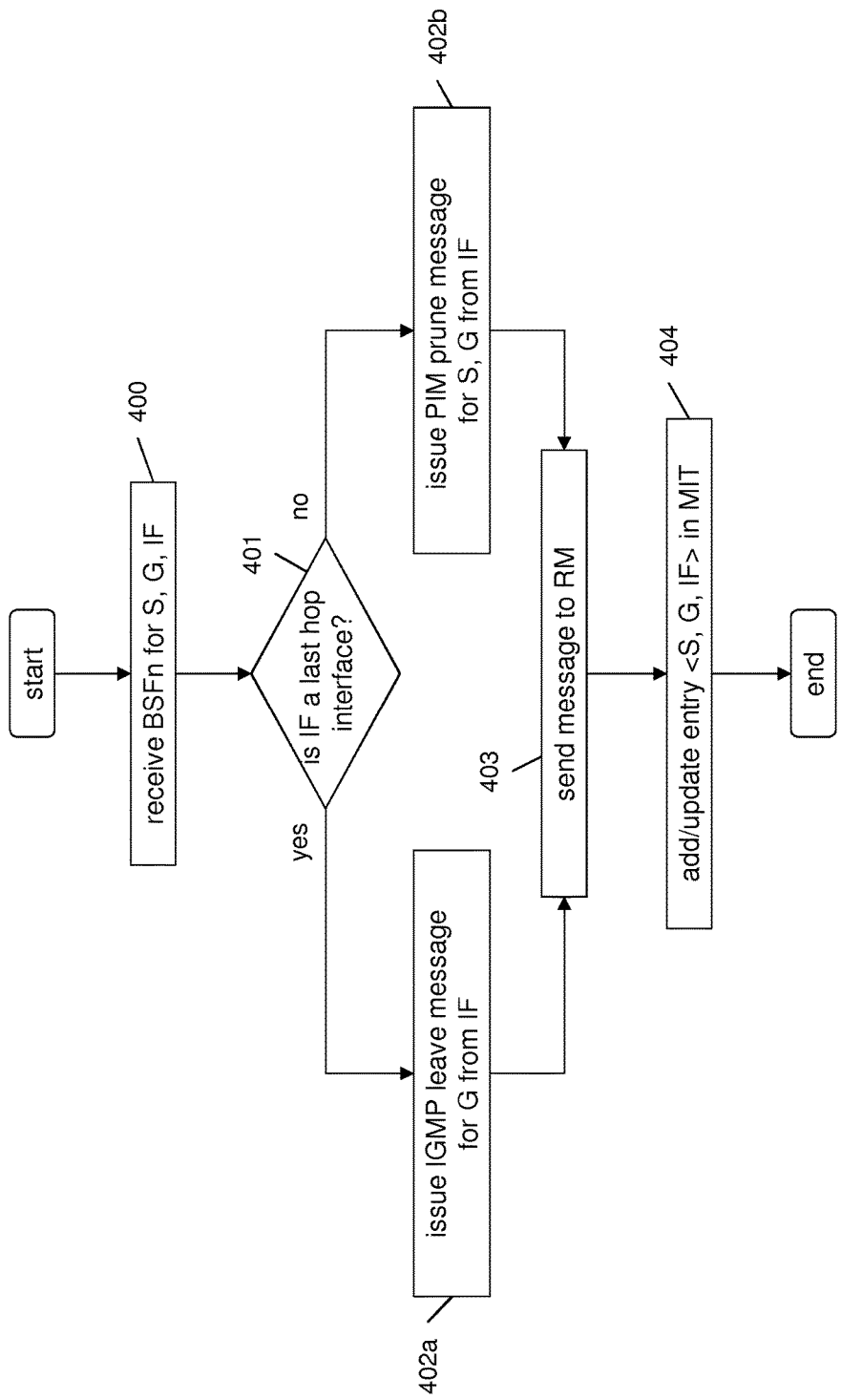
FIG. 4 is a flow chart illustrating steps of the method for managing a congestion at a multicast router according to an embodiment of the present invention.

The flowchart of FIG. 4 illustrates the operation of the multicast control manager MCM upon reception of a bad served flow notification BSFn from the congestion control unit CC.

At step 400, the multicast congestion manager MCM, in particular the notification manager NM, preferably receives a bad served flow notification BSFn from the congestion control unit CC. As described above, the bad served flow notification BSFn preferably comprises an information about the source S of the bad served data flow, an information about the multicast distribution group G receiving the bad served data flow and an information about the congested transmission interface IF. At step 401, the notification manager NM preferably checks whether the transmission interface IF is a last hop transmission interface for the router R3, i.e. whether the transmission interface IF is connected to a destination node. For example, in the exemplary router R3 of FIG. 2, the third transmission interface IF3 is a last hop interface as it is connected to the destination node D1.

Then, in any case, the notification manager NM preferably issues a forged signaling message FSm simulating a signaling message received from a downstream node via the transmission interface IF for requesting the interruption of the transmission of the bad served data flow from the congested router to the downstream node.

In particular, if the congested transmission interface IF is a last hop interface (for example, the interface IF3 in FIG. 2), the notification manager NM preferably issues a forged signaling message FSm simulating the signaling message that the router R3 would receive via the transmission interface IF from the destination node of the multicast distribution group G (for example, node D1 in FIG. 2) for requesting the interruption of the distribution of the bad served data flow. This message is issued according to the communication protocol used for the communication between the router R3 and the destination node connected to the router R3 via the transmission interface IF. According to preferred embodiments of the present invention, the communication protocol is the IGMP protocol and the notification manager NM issues a IGMP leave group message comprising the IP multicast group address of the multicast distribution group G associated to the bad served data flow, as illustrated in FIG. 4 (step 402a).

If the congested transmission interface IF is not a last hop interface (for example, the transmission interface IF1 or IF2 in FIG. 2), preferably the notification manager NM issues a forged signaling message FSm simulating the signaling message that the router R3 would receive via the transmission interface IF from a downstream router (for example, the router R4 or R7 in FIG. 2) for requesting not to receive the bad served data flow, i.e. for leaving the multicast distribution tree associated with the bad served data flow, according to the routing protocol implemented within the communication network N. According to preferred embodiments of the present invention, the routing protocol is the PIM protocol and the notification manager NM issues a PIM prune message comprising the IP address of source node S and the IP multicast group address associated to the bad served data flow (step 402b of FIG. 4).

At step 403, the notification manager NM preferably sends the forged signaling message FSm issued at step 402a or 402b to the replication manager RM that, accordingly, modifies the forwarding rule related to the bad served data flow into the forwarding table FT so that forwarding the bad served data flow downstream through the congested transmission interface IF is interrupted.

Issuance of the signaling message at step 402b may lead not only to interrupting the downstream distribution of the bad served data flow but also to releasing the transmission resources of the multicast distribution tree from the source node up to the congested router. Indeed, If the data flow identified as "bad served" at the congested router is distributed downstream only through the congested transmission interface and not through other transmission interfaces of the same router, the replication manager RM, in accordance with standard procedures provided by the multicast routing protocol (e.g. the PIM routing protocol), preferably handles the forged signaling message FSm so that the request not to receive the bad served data flow is forwarded from the congested router to the upstream router and the upstream router will interrupt forwarding the data flow to the congested router. This operation may be propagated upstream by each intermediate router along the multicast distribution tree associated to the bad served data flow and it may lead to a partial or complete release of the multicast distribution tree up to the source node, hence avoiding wastage of transmission resources.

In particular, according to the PIM routing protocol, if the data flow is forwarded downstream only through the congested interface, the congested router sends upstream a PIM prune message. Upon reception of this PIM prune message, the upstream router interrupts forwarding the data flow to the congested router. Then, the upstream router in turn may issue a PIM prune message (in case the upstream router forwards the data flow only through the interface from which it received the PIM prune message) and send it upwards, so that this mechanism may be propagated.

At step 404, preferably, the notification manager NM adds an entry <S, G, IF> in the membership inhibition table MIT and an expiration time for this entry. If an entry <S, G, IF> is already present in the membership inhibition table MIT, the notification manager NM, at step 404, updates the expiration time associated to this entry and sets its value to the current time incremented by the time-to-live TTL. Therefore, each time a bad served flow notification BSFn is received for a given bad served data flow, the expiration time associated to the corresponding entry is updated as described here above.

In this way, advantageously, the membership inhibition table MIT is constantly updated with a precise and timely indication of the bad served data flows currently being handled by the router R3.

Optionally, when an entry is added to the membership inhibition table MIT, the notification manager NM may forward to the external control system EC a corresponding notification. This notification may comprise also other information such as an information indicative of a class of service of the bad served data flow.

Figure 5:
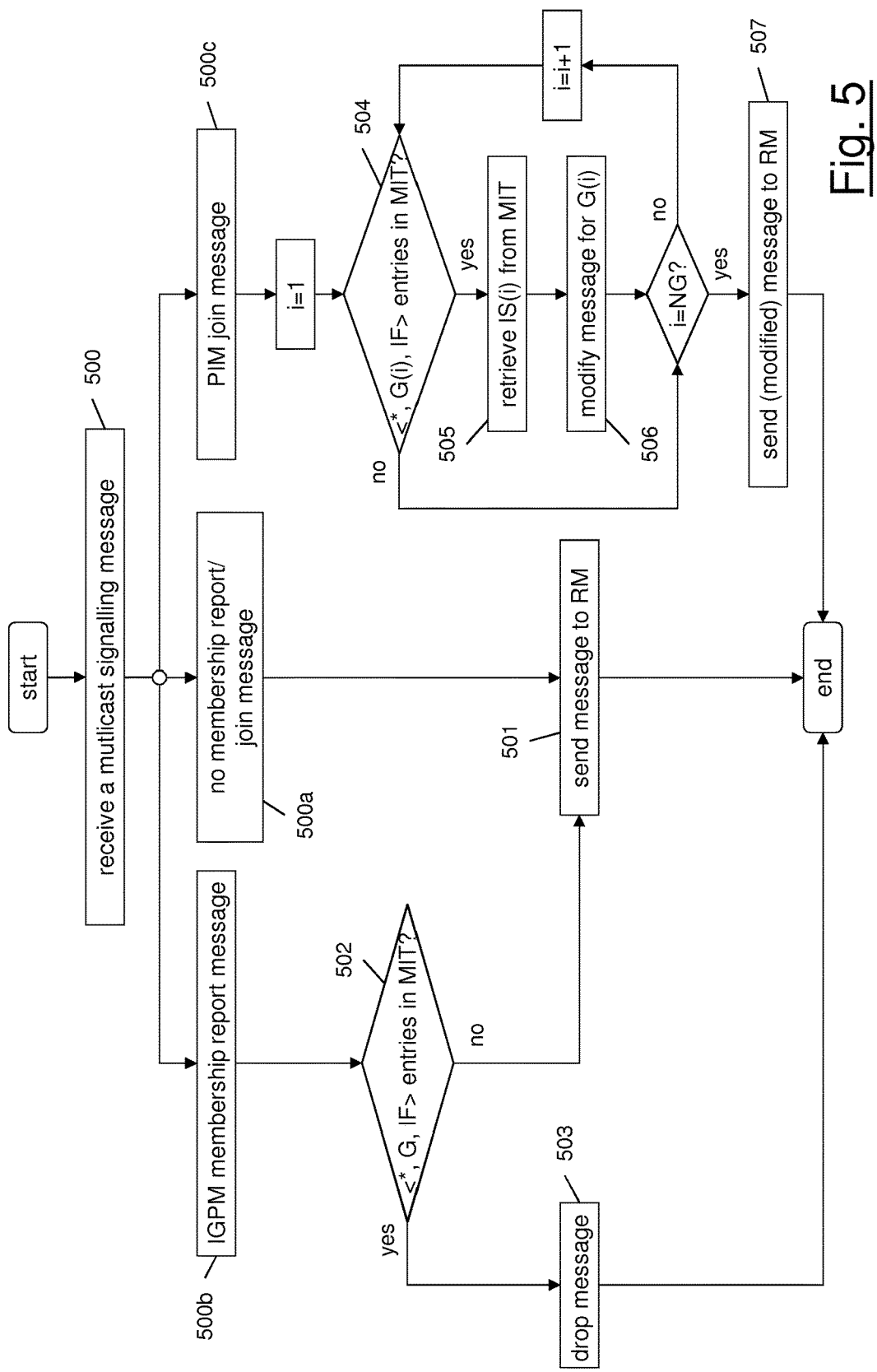
FIG. 5 is a flow chart illustrating further steps of the method for managing a congestion at a multicast router according to an embodiment of the present invention.

The flowchart of FIG. 5 illustrates the operation of the multicast control manager MCM upon reception of a signaling message Sm from the signaling input SI connected to the adjacent nodes of the network N.

At step 500 the multicast control manager MCM, in particular the multicast signaling manager MSM, preferably receives a signaling message Sm via the signaling input SI. Then, the multicast signaling manager MSM preferably checks whether the signaling message Sm is a signaling message indicative of the fact that a destination node wants to receive a given data flow. This message may be received when the distribution of this given data flow has been interrupted according to the procedure described above, and a destination node that belonged to the multicast distribution group for that given data flow, requests again to receive the given data flow or, in other words, requests to rejoin the multicast distribution group. This message may also be received when a destination node requests to join the multicast distribution group for the first time. If the router R3 acts as a local router, such a signaling message may be generated by a destination node according to the communication protocol implemented between the destination node and its local router and is indicated in the following as "membership message" (e.g., an IGMP membership report message). If the router R3 acts as a remote router, such a signaling message may be generated by a downstream router according to the routing protocol implemented within the network N (such downstream router wishing to receive the data flow for forwarding it towards the destination node) and is indicated in the following as "join message" (e.g., a PIM join message).

If the received signaling message Sm is not a signaling message indicative of the fact that a destination node wants to receive a given data flow (step 500a), then preferably the multicast signaling manager MSM forwards this signaling message to the replication manager RM without any modification (step 501).

If the received signaling message Sm is a membership message from a destination node (indicated in FIG. 3 by the reference "Mm") such as an IGMP membership report message (step 500b), it preferably comprises an information G indicative of the multicast distribution group to which the data flow is distributed, and an information IF indicative of the transmission interface of the router R3 through which the membership message has been received at the router R3. The multicast signaling manager MSM preferably checks whether the membership inhibition table MIT comprises one or more entries including the tuple <*, G, IF> (step 502). In the affirmative, the multicast signaling manager MSM preferably drops the membership message (step 503). In the negative, the multicast signaling manager MSM preferably sends the membership message to the replication manager RM (step 501) without modifications.

In this way, according to the present invention, for the validity time of the <S, G, IF> tuple in the membership inhibition table MIT, membership messages related to data flows affected by a congestion event are not forwarded to the replication manager RM and their distribution downstream the congested router R3 is inhibited If the received signaling message is a join message from a downstream router (indicated in FIG. 3 by the reference "Jm") such as a PIM join message (step 500c), it preferably contains a number NG of multicast distribution groups G(i), i=1, . . . , NG, wherein NG is an integer number equal to or higher than 1, and, for each multicast distribution group G(i), an information S indicative of the source node(s) of the data flow(s) distributed to the multicast distribution group G(i), an information G(i) indicative of the multicast distribution group and an information IF indicative of the transmission interface through which that join message has been received by the router R3. Preferably, for each multicast distribution group G(i), the multicast signaling manager MSM checks whether the membership inhibition table MIT comprises one or more entries including the tuple <*, G(i), IF> (step 504).

If all the checks are negative (namely, for each multicast distribution group G(i) the membership inhibition table MIT does not comprise any entry including the tuple <*, G(i), IF>; i=NG in the flowchart of FIG. 5), the multicast signaling manager MSM preferably sends the join message to the replication manager RM (step 507) without modifications.

On the other hand, if, for a multicast distribution group G(i), the membership inhibition table MIT comprises one or more entries including the tuple <*, G(i), IF>, the multicast signaling manager MSM preferably retrieves from the membership inhibition table MIT a list of all the source nodes for the multicast distribution group G(i) and the transmission interface IF (i.e. all the source nodes transmitting a data flow to the destination nodes of the multicast distribution group G(i) through the transmission interface IF) and stores these source nodes in a temporary list of inhibited sources IS(i) (step 505). Then, the multicast signaling manager MSM preferably modifies the portion of the join message related to the multicast distribution group G(i) so as to exclude the source nodes comprised within the temporary list of inhibited sources IS(i) (step 506).

Once all the multicast distribution groups G(i) of the join message have been considered (i=NG in the flowchart of FIG. 5), the multicast signaling manager MSM preferably issues a modified join message (indicated in FIG. 3 by the reference "MJm"). The modified join message according to the present invention comprises only the portions of the join message related to data flows that are not experiencing any congestion event. Then, the multicast signaling manager MSM preferably sends the modified join message to the replication manager RM (step 507). Therefore, according to the present invention, the portions of the join message related to data flows experiencing a congestion at the transmission interface IF are not forwarded to the replication manager RM.

The replication manager RM then preferably handles the membership messages received from the multicast signaling manager MSM according to the communication protocol implemented between the router and the destination nodes (e.g. the IGMP protocol) and writes/modifies the forwarding table FT so that the destination node that sent the membership message is able to receive the requested data flow. The replication manager RM also preferably handles the join messages and the modified join messages received from the multicast signaling manager MSM according to the routing protocol implemented by the routers (e.g. the PIM protocol). In particular, according to the PIM protocol, the router R3 sends upstream each PIM join message and modified PIM join message so as to operate each router to forward data from the source node(s) to the multicast distribution group(s) as indicated in the message.

Preferably, periodically, the rule expiration manager REM scans the multicast inhibition table MIT in order to check whether the expiration time associated to each entry is expired. In case the expiration time associated to an entry is expired (i.e. the notification manager NM has not received any bad served flow notification related to this entry for a period of time corresponding to the fixed time-to-live TTL), the entry is removed from the multicast inhibition table MIT.

In this way, the membership messages and join messages possibly received by the multicast signaling manager MSM and related to deleted entries will be forwarded to the replication manager RM without modification and will be handled according to the corresponding protocols (e.g. IGMP protocol and PIM protocol, respectively).

The method of the present invention allows managing a congestion at a multicast router in an efficient manner. Indeed, the method of the present invention does not require any intervention from the hosts. Indeed, the present invention provides for forging leave/prune signaling messages at a router experiencing a congestion for interrupting the distribution of a congested data flow as if they were received from a node of the multicast distribution tree downstream the congested router. These forged leave/prune messages are completely compliant with standard protocols (e.g. the IGMP protocol and the PIM protocol). This does not require any customization of the hosts to which the data flows are to be distributed and hence it may be applied to commercially available standard client devices without any modification.

Moreover, advantageously, the method of the present invention is operated directly on the router which is experiencing a congestion event and does not require that messages of the congested data flow are forwarded up to the destination nodes before being processed. This advantageously allows reacting to a congestion event very quickly thus minimizing the packet losses.

Finally, the method of the present invention in principle does not require to be implemented at each router of a multicast communication network. For instance, it may be efficiently applied only at some routers where congestion events are more likely to occur. Indeed, as already described above, the mechanism of the present invention is advantageously implemented in a manner completely compliant with the standard protocols used for multicast communication networks (e.g. the IGMP protocol and the PIM protocol) so that even if a router is not configured to implement the method of the present invention it may however receive and process the messages generated/modified by a router according to the present invention and cooperate with it for managing the congestion.

The invention claimed is:

1. A method for managing congestion in a communication network, said network supporting transmission of a number of multicast data flows, said method comprising:

detecting congestion at a transmission interface of a router of said network;

identifying a data flow that suffers a packet loss of a plurality of data flows that are forwarded through said transmission interface, the data flow that suffers the packet loss being identified when an amount of packets lost from the data flow exceeds a predetermined threshold within a predetermined time period, said identifying including issuing a bad served flow notification comprising information associated to said data flow, said information indicative of a source node of said data flow, a multicast distribution group associated to said data flow, and said transmission interface;

processing said bad served flow notification and writing/updating an entry in a membership inhibition table with information from said processing, said entry associated to said data flow and comprising said information indicative of a source node of said data flow, a multicast distribution group associated to said data flow, and said transmission interface;

interrupting, by the router, transmission of said data flow through said transmission interface downstream of the router and, in case said data flow would be transmitted downstream of the router through said transmission interface, sending a request to an upstream router for interrupting the transmission of said data flow from said upstream router to said router; and inhibiting, for a given period of time, any request to forward said data flow via said transmission interface.

2. The method according to claim 1, wherein said entry further comprises an expiration time indicative of a time at which said entry will be removed from said membership inhibition table, said expiration time starting upon said writing/updating of the information of said bad served flow notification into the membership inhibition table.

3. The method according to claim 1, wherein said interrupting comprises issuing a forged signaling message simulating a signaling message that the router would receive via said transmission interface from a node of said network downstream said router, for requesting the interruption of the transmission of said data flow from said router to said downstream node.

4. The method according to claim 3, wherein said downstream node is a destination node of said multicast distribution group and said forged signaling message is an Internet group management protocol (IGMP) leave group message.

5. The method according to claim 3, wherein said downstream node is a further router of the network belonging to a multicast distribution tree associated with said data flow and said forged signaling message is a protocol independent multicast (PIM) prune message.

6. The method according to claim 1, wherein said inhibiting comprises, upon reception of a join message from a further router of the network belonging to a multicast distribution tree associated with said data flow, said join message that is indicative of the fact that said further router wants to receive said data flow, checking whether a membership inhibition table comprises one or more entries related to said multicast distribution group and said transmission interface, and, in the affirmative, on the basis of said one or more entries, modifying said join message so as to remove a portion of said join message related to said source node and any other source node transmitting said data flow to said multicast distribution group through said transmission interface.

7. The method according to claim 6, wherein said join message is a protocol independent multicast (PIM) join message.

8. The method according to claim 1, wherein the predetermined threshold is set based on a data coding used in the data flow.

9. A non-transitory computer-readable medium encoded with computer-readable instructions that, when executed by a computer, cause the computer to perform the method according to claim 1.

10. A method for managing congestion in a communication network, said network supporting transmission of a number of multicast data flows, said method comprising:
 detecting congestion at a transmission interface of a router of said network;
 identifying a data flow that suffers a packet loss of a plurality of data flows that are forwarded through said transmission interface, the data flow that suffers the packet loss being identified when an amount of packets lost from the data flow exceeds a predetermined threshold within a predetermined time period, said identifying including issuing a bad served flow notification comprising information associated to said data flow, said information indicative of a source node of said data flow, a multicast distribution group associated to said data flow, and said transmission interface;
 interrupting, by the router, transmission of said data flow through said transmission interface downstream of the router and, in case said data flow would be transmitted downstream of the router through said transmission interface, sending a request to an upstream router for interrupting the transmission of said data flow from said upstream router to said router; and
 inhibiting, for a given period of time, any request to forward said data flow via said transmission interface,
 wherein said inhibiting comprises, upon reception of a membership message from a destination node of the network indicative of the fact that said destination node wants to receive said data flow, checking whether a membership inhibition table comprises one or more entries related to said multicast distribution group and said transmission interface, and, in the affirmative, dropping said membership message.

11. The method according to claim 10, wherein said membership message is an Internet group management protocol (IGMP) membership report message.

12. A router comprising:
 a transmission interface configured to transmit packets; and
 a congestion controller configured to:
  upon detection of a congestion at said transmission interface of said router, identify a data flow that suffers a packet loss of a plurality of data flows that are forwarded through said transmission interface, the data flow that suffers the packet loss being identified when an amount of packets lost from the data flow exceeds a predetermined threshold within a predetermined time period,
  issue, upon identification of the data flow, a bad served flow notification comprising information associated to said data flow, said information indicative of a source node of said data flow, a multicast distribution group associated to said data flow, and said transmission interface,
 wherein the router is configured to process said bad served flow notification and writing/updating an entry in a membership inhibition table with information from said processing, said entry associated to said data flow and comprising said information indicative of a source node of said data flow, a multicast distribution group associated to said data flow, and said transmission interface,
 the router is configured to interrupt the transmission of said data flow through said transmission interface downstream of the router and, in case said data flow would be transmitted downstream of the router through said transmission interface only, send a request to an upstream router for interrupting the transmission of said data flow from said upstream router to said router, and
 the router is configured to inhibit, for a given period of time, any request to forward said data flow via said transmission interface.

13. A communication network comprising a router according to claim 12.

* * * * *